US008634882B2

United States Patent
Ahn et al.

(12) United States Patent
(10) Patent No.: US 8,634,882 B2
(45) Date of Patent: Jan. 21, 2014

(54) POP-UP APPARATUS FOR PORTABLE COMMUNICATION DEVICE

(75) Inventors: Sung-Ho Ahn, Seoul (KR);
 Seung-Hoon Lee, Gyeonggi-do (KR);
 Jong-Woo Kim, Gyeonggi-do (KR);
 Soung-Jun Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 172 days.

(21) Appl. No.: 12/847,032

(22) Filed: Jul. 30, 2010

(65) Prior Publication Data
 US 2011/0045877 A1 Feb. 24, 2011

(30) Foreign Application Priority Data
 Aug. 19, 2009 (KR) .................. 10-2009-0076829

(51) Int. Cl.
 *H04M 1/00* (2006.01)
(52) U.S. Cl.
 USPC .............. 455/575.1; 455/550.1; 455/575.2; 455/575.3; 455/575.4; D14/137; D14/138 AD
(58) Field of Classification Search
 USPC ............... 455/575.1–575.4, 550.1; D14/137–138 AD
 See application file for complete search history.

(56) References Cited

U.S. PATENT DOCUMENTS

| 6,812,958 | B1* | 11/2004 | Silvester ................ 348/207.1 |
| 7,046,287 | B2* | 5/2006 | Nishino et al. .......... 348/333.06 |
| 7,184,803 | B2* | 2/2007 | Wu ........................ 455/575.1 |
| 7,477,315 | B2* | 1/2009 | Shin ........................ 348/373 |
| 7,477,736 | B2* | 1/2009 | Ibaraki et al. ........... 379/433.13 |
| 7,636,591 | B2* | 12/2009 | Kim et al. ................ 455/575.4 |
| 7,847,860 | B2* | 12/2010 | Kim ........................ 348/375 |
| 2004/0095500 | A1* | 5/2004 | Sato et al. ............... 348/340 |
| 2005/0245295 | A1* | 11/2005 | Lee et al. ................ 455/575.1 |
| 2006/0166712 | A1* | 7/2006 | Wu ........................ 455/575.1 |
| 2007/0254730 | A1* | 11/2007 | Kim et al. ................ 455/575.4 |

* cited by examiner

*Primary Examiner* — Fayyaz Alam
(74) *Attorney, Agent, or Firm* — Cha-Reiter, LLC

(57) ABSTRACT

A pop-up apparatus for a portable communication device for insertion or ejection of parts of the portable communication device is provided. The pop-up apparatus preferably includes a body housing, a pop-up housing embedded in the body housing and inserted into or ejected from the body housing. The insertion or ejection can be performed by applying pressure to button on a surface thereof in a direction that it is pressed, and at least one or more pop-up hinge portions are provided between the body housing and the pop-up housing to insert the pop-up housing into or eject the pop-up housing from the body housing by pressing of the pop-up housing.

20 Claims, 17 Drawing Sheets

POP-UP APPARATUS FOR PORTABLE COMMUNICATION DEVICE

CLAIM OF PRIORITY

This application claims the benefit under 35 U.S.C. §119 (a) of a Korean Patent Application filed in the Korean Intellectual Property Office on Aug. 19, 2009 and assigned Serial No. 2009-76829, the entire disclosure of which is hereby incorporated by reference in its entirety.

BACKGROUND OF THE INVENTION

1. Field of the Invention

The present invention relates to a pop-up apparatus for a portable communication device. More particularly, the present invention is related to a pop-up apparatus for a portable communication device that is configured to insert in or extend parts from the portable communication device.

2. Description of the Related Art

Generally, as understood by a person of ordinary skill in the art, 'portable communication devices' refer to devices by which radio communication can be performed, while the devices are being carried. For the sake of portability, designs of such portable communication devices tend to be compact, slim, tightly gripped, and light. Multimedia availability is also a consideration because having a widest variety of functions strongly desired by most users. In particular, the current trend is that future portable communication devices should incorporate greater multi-functionality and multi-purpose utilization, as well as being more compact and lighter than known heretofore, while being capable of accessing various multimedia environments or Internet environments. Additionally, current portable communication devices are now commonly used throughout the world, and are recognized by many people as a nearly indispensable commodity, which must always be carried when moving about.

Conventional portable communication devices may be classified into various types according to the appearance of the housing. For example, the portable communication devices are classified into bar-type communication devices, flip-type portable communication devices and folder-type portable communication devices. The bar-type portable communication device has a single housing shaped like a bar. The flip-type portable communication device has a flip, which is pivotably mounted to a bar-shaped housing by a hinge unit. The folder-type portable communication device has a folder coupled to a single bar-shaped housing by a hinge unit to allow rotation of the holder towards the housing to close it, or away from the housing to unfold it.

Furthermore, portable communication devices may be classified into rotation-type communication devices and sliding-type communication devices depending on the particular way the communication device is opened. In the rotation-type portable communication device, two housings are coupled to each other to allow one housing to rotate open or closed relative to the other while facing each other. In the sliding-type portable communication device, two housings are coupled to each other to allow one housing to slide open or closed relative to the other. These variously classifications of portable communication devices are well-known to those of ordinary skill in the art.

Current portable communication devices are typically equipped with a camera module that includes camera lenses, which enable each of the respective communication devices to obtain and then transmit an image signal.

In addition, portable communication devices have a speaker module, a microphone device, a keypad, and the camera lens module may be arranged inside or outside thereof to perform video communication with a partner or execute a photographing function.

However, there are portions of the conventional portable communication device that are not protected from an external environment, including protection from foreign substances being introduced to parts of the portable communication device.

The camera module lens, which is exposed to the external environment at all times, is often subject to being soiled by dust, dirt, fingerprints, the weather elements, etc., and cannot be protected from the external environment without an additional protection device. However, if the additional protection device for protecting the parts is used, the size of the conventional portable communication device increases.

In an attempt to solve the foregoing problems, a built-in camera lens module embedded in the communication device has been developed. However, since such a camera lens module normally is formed in a cylindrical shape, the camera lens module cannot be designed to fit into the shape of the communication device formed longitudinally.

Moreover, the cylindrical camera lens module increases the thickness of the communication device, thereby hindering miniaturization of the communication device.

Furthermore, in the conventional art, the cylindrical lens module is merely rotated upward or downward, thus being purely functional and providing no pleasure in use and thus no satisfaction in terms of amusement.

Recently, a portable terminal has been designed in which the speaker module and a camera lens exposed to the outside of the camera in a bar-type touch terminal, thereby spoiling the design of the terminal.

Accordingly, there is a long-felt need in the art for an apparatus that allows parts, such as a speaker module, a microphone device, a camera lens, and the like, to be inserted into or ejected from a communication device by merely pressing, thereby providing amusement in using the communication device and preventing the parts from being exposed to outside unless in use, thereby making the exterior design of the communication device more elegant than known heretofore.

SUMMARY OF THE INVENTION

An exemplary aspect of the present invention is to provide a pop-up apparatus for a portable communication device, which can be configured for inserting or ejecting parts of the communication device by touch, thereby enhancing amusement in using the communication device and making the exterior design of the communication device more elegant than known heretofore.

Another exemplary aspect of the present invention is to provide a pop-up apparatus for a portable communication device, which is configured for inserting or ejecting parts of the communication device by pressing a button portion, thereby facilitating the use of the communication device, enhancing amusement in using the communication device and making the exterior design of the communication device more elegant than known heretofore.

According to yet another exemplary aspect of the present invention, there is provided a pop-up apparatus for a portable communication device, the pop-up apparatus preferably including a body housing, a pop-up housing embedded in or arranged at least partially within or on the body housing and inserted into or ejected from the body housing by touch, such as being pressed on a surface thereof in a direction that the pop-up is being pressed, and at least one or more pop-up hinge portions provided between the body housing and the pop-up housing for inserting the pop-up housing into or ejecting the pop-up housing from the body housing by pressing of the pop-up housing.

According to still another exemplary aspect of the present invention, there is provided a pop-up apparatus for a portable communication device, the pop-up apparatus including a body housing comprising button portions exposed to an exterior, a pop-up housing embedded in the body housing and inserted into or ejected from the body housing by applying a sufficient force to the button portions, and at least one or more pop-up hinge portions provided between the body housing and the pop-up housing such that upon applying sufficient force to the pop-up housing, the pop-up housing is confined into the body housing, and upon applying a subsequent force to the button portions, the pop-up housing is ejected from the body housing. The pop-up housing optionally can be locked down when inserted in the body housing and unlocked when the subsequent force is applied to at least one button portion so that the pop-up housing may be ejected or extended from the portable communication device.

BRIEF DESCRIPTION OF THE DRAWINGS

The above and other exemplary features and advantages of exemplary embodiments of the present invention will be more apparent from the following detailed description taken in conjunction with the accompanying drawings, in which.

DETAILED DESCRIPTION

Figure 1:
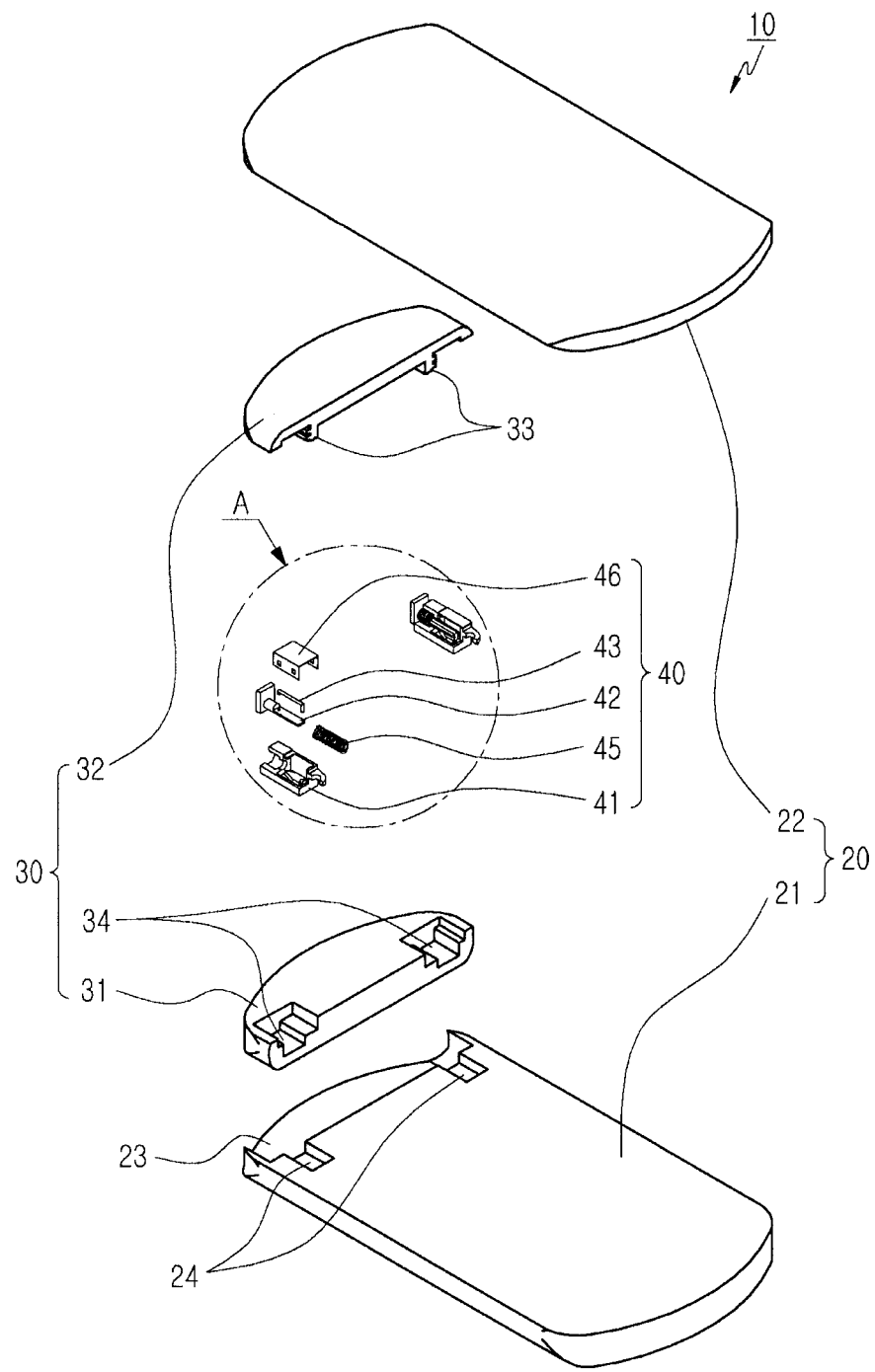
FIG. 1 is an exploded perspective view of a pop-up apparatus for a portable communication device according to a first exemplary embodiment of the present invention.

Hereinafter, first and second exemplary embodiments of a pop-up apparatus according to the presently claimed invention will be described in more detail with reference to the accompanying drawings. It should be understood by a person of ordinary skill in the art that the exemplary embodiments described herein and structures shown in the drawings are merely the preferred first and second exemplary embodiments of the present invention, and various modifications can be substitute for the exemplary embodiments and structures shown herein that are within the spirit of the invention and the scope of the appended claims.

As shown in FIGS. 1 through 9, a pop-up apparatus 10 for a portable communication device preferably includes a body housing 20, a pop-up housing 30, and at least one or more pop-up hinge portions 40. The body housing 20 is configured for insertion of the pop-up housing 30 into or ejection of the pop-up housing 30 from the body housing 20, typically by pressing or applying a force thereto. Preferably, the pop-up housing 30 is embedded in the body housing 20 and can be inserted into or ejected from the body housing 20 in a direction in which it is pressed on a surface thereof. The pop-up hinge portions 40 are provided between the body housing 20 and the pop-up housing 30 to be inserted into or ejected from the body housing 20.

Figure 2:
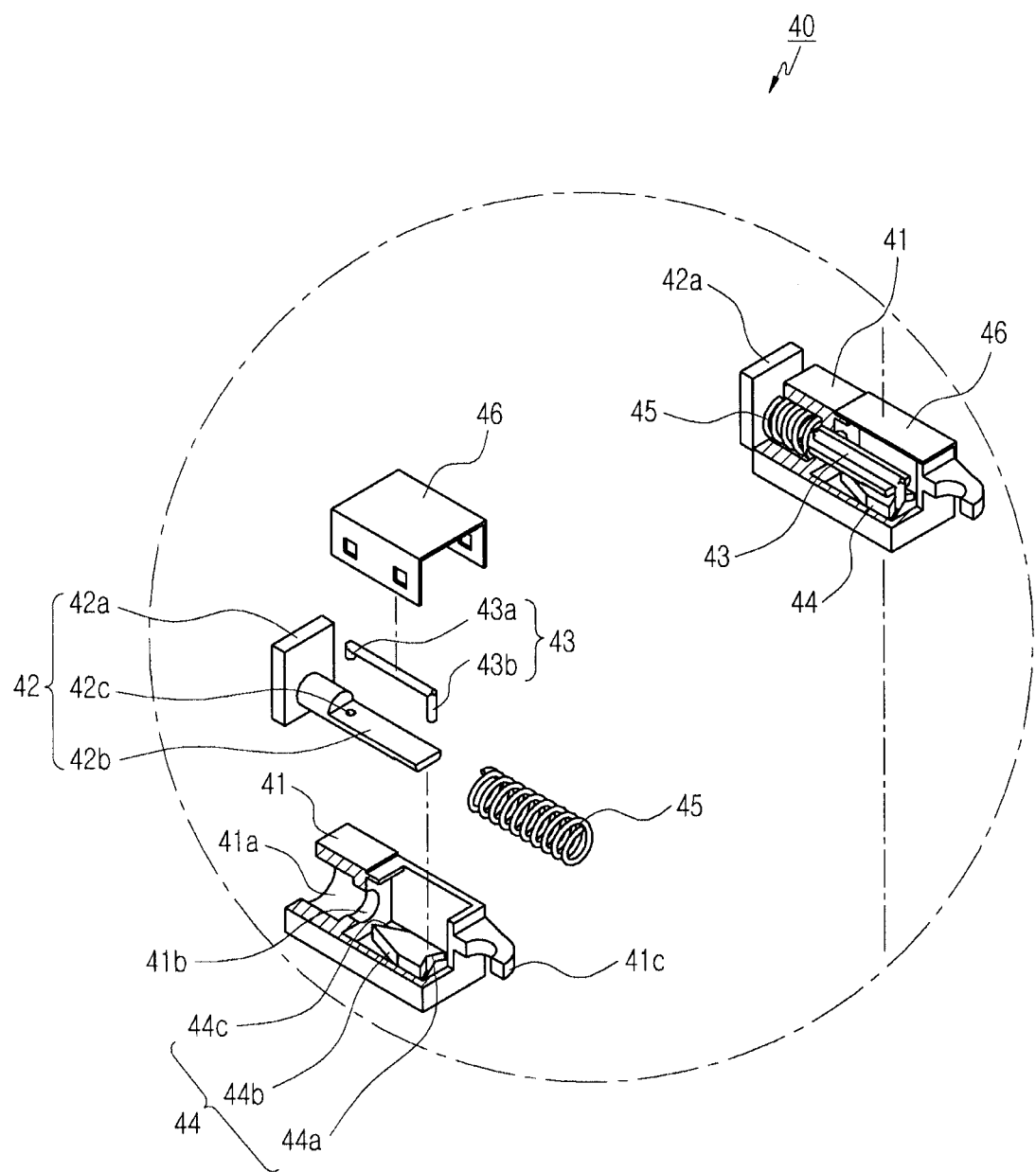
FIG. 2 is an enlarged exploded perspective view of a portion A of FIG. 1.
Figure 3:
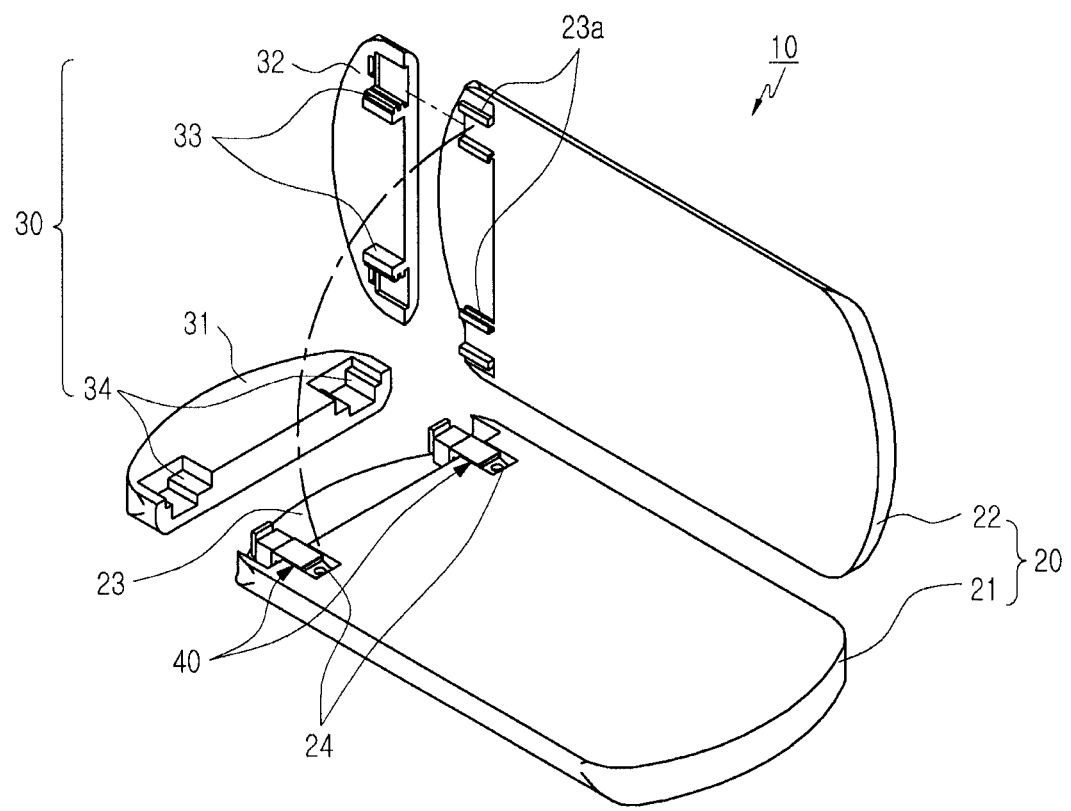
FIG. 3 is an exploded perspective view showing a pop-up apparatus for a portable communication device prior to assembly, according to a first exemplary embodiment of the present invention.

As shown in FIGS. 1 through 3, the body housing 20 preferably includes a first housing 21 and a second housing 22. At a first end of the body housing 20 a mounting recess 23 is formed for mounting the pop-up housing 30 therein for insertion into or ejection from the body housing 20. In the mounting recess 23 are formed first guide portions 23a (FIG. 3) for guiding insertion or ejection of the pop-up housing 30.

As also shown in FIGS. 1 through 3, the pop-up housing 30 includes a first housing 31 and a second housing 32. On the pop-up housing 30 are formed second guide portions 33 (FIG. 3) for guiding insertion or ejection of the pop-up housing 30 while being coupled with the first guide portions 23a of the body housing 20.

With continued reference to FIGS. 1 through 3, first resting portions 24 for resting the pop-up hinge portions 40 thereon are formed in the body housing 20, and second resting portions 34 for resting the pop-up hinge portions 40 thereon are formed in the pop-up housing 30.

Now referring to FIGS. 1 through 9, the pop-up hinge portions 40 preferably include a hinge housing 41, a shaft 42, a locking portion 43, a guide stopper cam 44, an elastic member 45, and a hinge cover 46 (see, for example, FIG. 2). The hinge housing 41 is configured to accommodate the shaft 42, the locking portion 43, the guide stopper cam 44, the elastic member 45, and the hinge cover 46. The shaft 42 is received in the hinge housing 41 such that it slides to be inserted or ejected by pressing of the pop-up housing 30. The locking portion 43 is rotatably coupled with the shaft 42, so that when the pop-up housing 30 is pressed, the shaft 42 also becomes pressed and the locking portion 43 is confined by being caught in the guide stopper cam 44 or the confinement of the locking portion 43 is released. The guide stopper cam 44 is formed in the hinge housing 41 such that the shaft 42 is pressed to rotate the locking portion 43 and thus the locking portion 43 is confined by being locked in the guide stopper cam 44 or the locking thereof is released, thereby sliding the shaft 42. The elastic member 45 is coupled with the shaft 42 to provide an elastic force for sliding the shaft 42. The hinge cover 46 is coupled with an outer side of the hinge housing 41 to protect the hinge housing 41. An artisan should understand and appreciate that while the elastic member 45 shown in FIG. 2 is a coil spring, other types of biasing elements can be used.

With reference to FIGS. 1 and 2, the hinge housing 41 is provided with an elastic space 41a to be coupled with the elastic member 45. A through-hole 41b for passing the shaft 42 therethrough is formed in the hinge housing 41, at an end of which is formed an engaging portion 41c to be engaged with the body housing 20.

With reference now to FIGS. 1 through 3, the shaft 42 includes a shaft head portion 42a, a rotation space 42b, and a rotation hole 42c. The shaft head portion 42a is coupled with the pop-up housing 30 to be pressed along with pressing of the pop-up housing 30. The rotation space 42b is formed downward from the shaft head portion 42a to allow rotation of the locking portion 43, and the rotation hole 42c is formed in the rotation space 42b to be rotatably coupled with the locking portion 43.

With reference to FIGS. 1 through 9, the locking portion 43 (FIG. 2) includes a wire locking portion. A first end of the locking portion 43 is rotatably coupled with the rotation hole 42c and a second end thereof is coupled with the guide stopper cam 44 to be guided.

The guide stopper cam 44 includes a stopper portion 44a, a first guide cam 44b, and a second guide cam 44c. The stopper portion 44a moves the locking portion 43 together with the shaft 42 by pressing of the pop-up housing 30 to release locking of the locking portion 43 or to confine the locking portion 43. The first guide cam 44b is formed adjacent to the stopper portion 44a to guide the locking portion 43 such that the pop-up housing 30 can be ejected when the locking of the locking portion 43 from the stopper portion 44a is released. The second guide cam 44c is formed adjacent to the stopper portion 44a to guide the locking portion 43 such that the pop-up housing 30 can be inserted when the locking portion 43 is confined by being locked in the stopper portion 44a.

In the pop-up housing 30 may be formed at least one or more among a speaker module, a microphone device, and a camera lens module (not shown), and other parts that preferably impart additional functionality to the portable communication device.

As previously discussed herein, portable communication devices may be generally classified into flip-type communication devices, folder-type communication devices, bar-type communication devices, and slide-type communication devices depending on their appearance or the particular way the communication device operates. The presently claimed invention is applicable to any one of those types of devices.

In addition, although a bar-type portable communication device has been used as an example in the present invention, the portable communication device according to the presently claimed invention may comprise many of the various types of devices, and is not limited to a mobile communication terminal.

Examples of the portable communication devices according to the present invention may include not only mobile communication terminals operating according to communication protocols corresponding to various communication systems, but also any information communication apparatuses and multimedia apparatuses such as Portable Multimedia Players (PMPs), MP3 players, digital broadcasting players, Personal Digital Assistants (PDAs), and so forth, and their application apparatuses, just to name a few non-limiting examples.

With continued reference to FIGS. 1 through 9, a detailed description will be made of an operating process of the pop-up apparatus 10 for a portable communication device according to the first exemplary embodiment of the present invention.

The pop-up apparatus 10 preferably comprises the body housing 20 having the first housing 21 and the second housing 22, the pop-up housing 30 having the first housing 31 and the second housing 32, and the at least one or more pop-up hinge portions 40. The pop-up hinge portions 40 include the hinge housing 41, the shaft 42, the locking portion 43, the guide stopper cam 44, the elastic member 45, and the hinge cover 46.

The elastic member 45 is provided to the elastic space 41a provided in the hinge housing 41, and the shaft 42 passes through the elastic member 45 and is through-coupled with the through hole 4 lb formed in the hinge housing 41.

In this state, the first end of the locking portion 43 is rotatably coupled with the rotation hole 42c formed in the shaft 42. The second end of the locking portion 43 is coupled with the guide stopper cam 44.

In addition, the locking portion 43 is rotatably coupled with the rotation space 42b formed in the shaft 42. In this condition, the hinge cover 46 is coupled with the outer side of the hinge housing 41.

The hinge housing 41 is engaged with the body housing 20 by means of the engaging portion 41c formed at an end of the hinge housing 41. The shaft head portion 42a is coupled with the pop-up housing 30.

Figure 4:
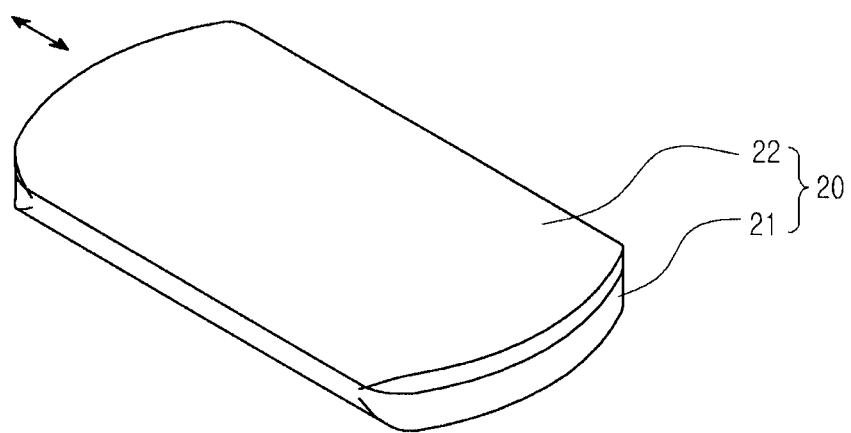
FIG. 4 is a perspective view showing a pop-up apparatus for a portable communication device prior to being operated, according to a first exemplary embodiment of the present invention.
Figure 5:
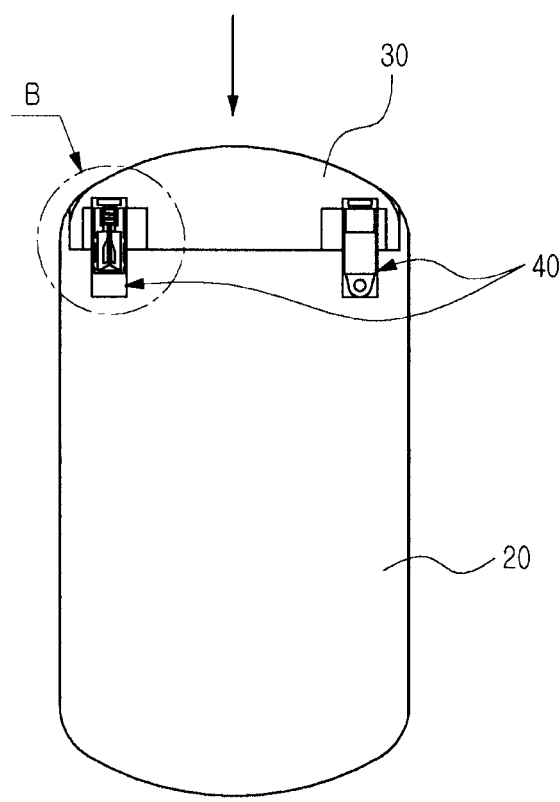
FIG. 5 is a cutaway plan view showing a pop-up apparatus for a portable communication device prior to being operated according to a first exemplary embodiment of the present invention.
Figure 6:
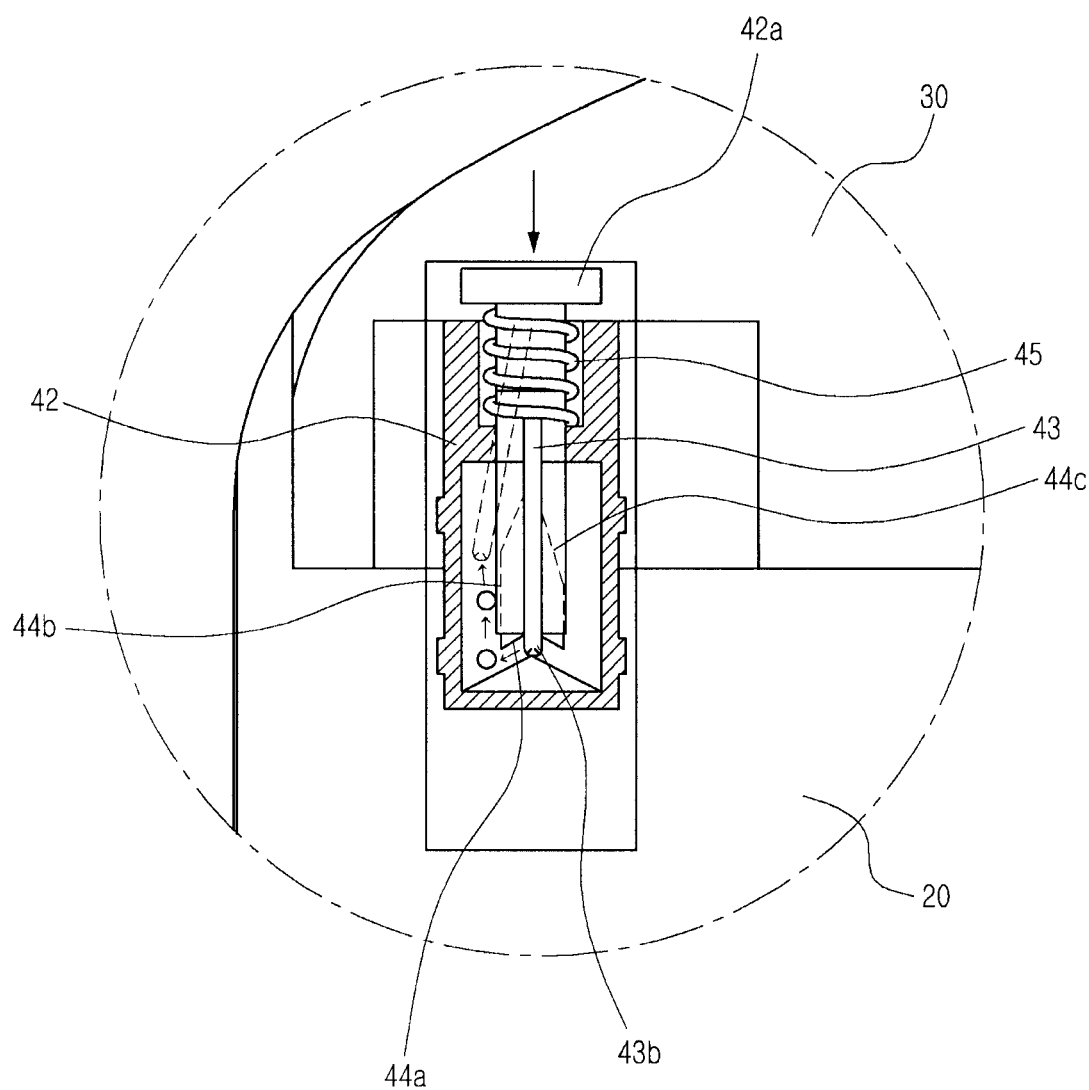
FIG. 6 is an enlarged cutaway plan view of a portion B of FIG. 5.

With reference to FIGS. 4 through 6, in order to eject the pop-up housing 30 embedded in the mounting recess 23 formed in the body housing 20, a user presses a surface of the pop-up housing 30.

Figure 7:
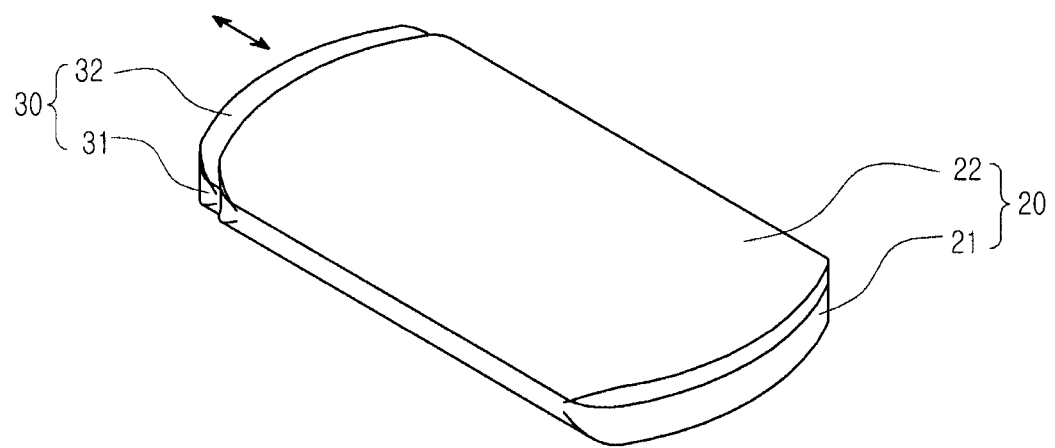
FIG. 7 is a perspective view showing a pop-up apparatus for a portable communication device after being operated according to a first exemplary embodiment of the present invention.

Then, as shown in FIG. 7, the pop-up housing 30 is ejected from the mounting recess 23 of the body housing 20 and is guided by the first guide portions 23a formed in the mounting recess 23.

The pop-up housing 30 is guided by the second guide portions 33 formed in the pop-up housing 30.

As shown in FIG. 6, as the pop-up housing 30 is pressed, the shaft head portion 42a is also pressed, together with the shaft 42. As the shaft 42 is pressed, the locking portion 43 is also pressed. Since the first end of the locking portion 43 is rotatably coupled with the rotation hole 42c, along with rotation of the first end of the locking portion 43, the second end of the locking portion 43 is unlocked from the stopper portion 44a and is guided along the first guide cam 44b.

Figure 9:
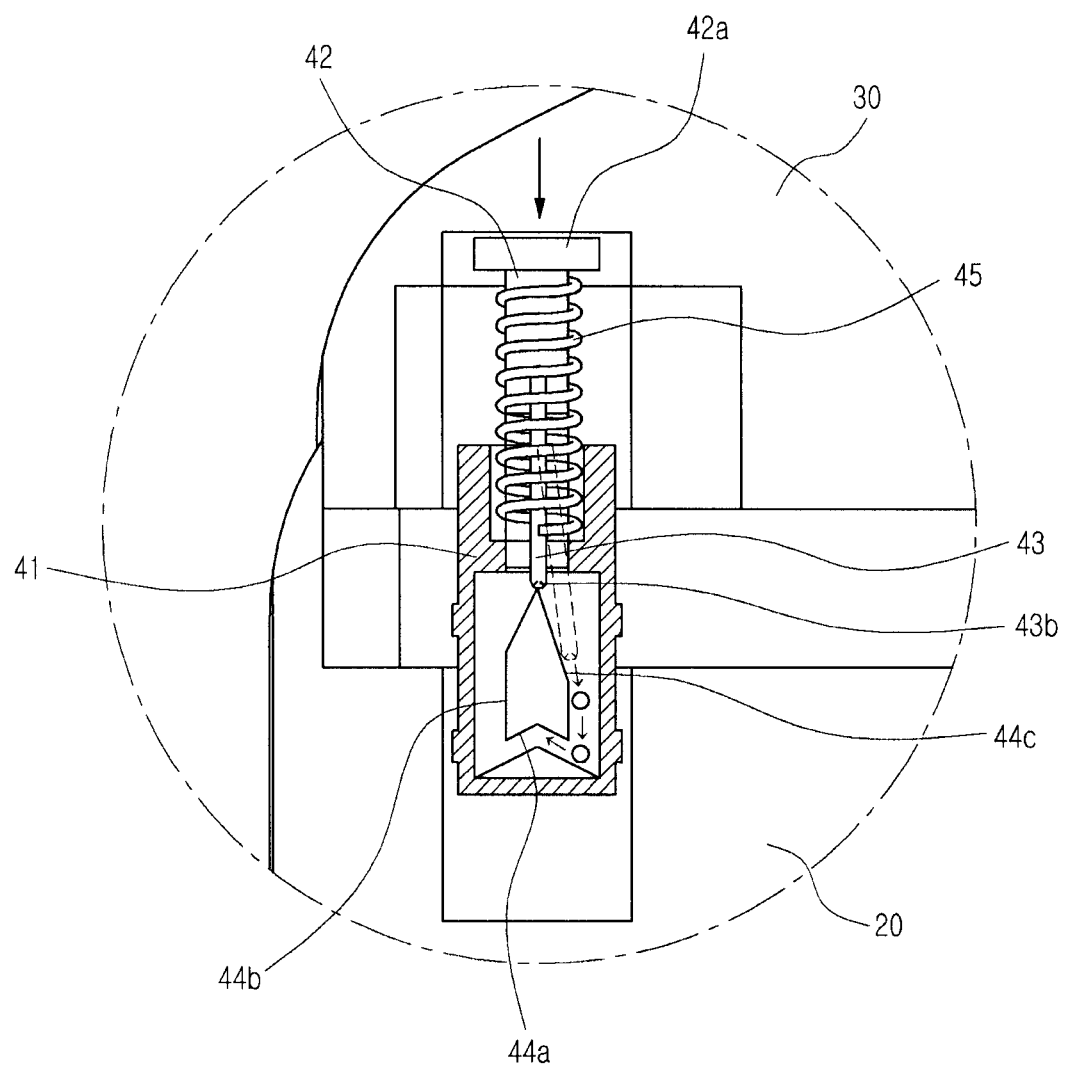
FIG. 9 is an enlarged cutaway plan view of a portion C of FIG. 8.

In this state, as shown in FIGS. 6 and 9, the locking portion 43 is unlocked from the stopper portion 44a and moves the shaft 42 by means of a biasing force of the elastic member 45 coupled with the shaft 42.

As shown in FIGS. 6 and 7, the locking portion 43 is guided along the first guide cam 44b by means of the elastic force of the elastic member 45, and the shaft head portion 42a and the shaft 42 also move, such that the pop-up housing 30 is ejected from the mounting recess 23 of the body housing 20.

In this ejected position, as shown in FIG. 4, to insert the pop-up housing 30 back into the mounting recess 23 of the body housing 20, upon pressing of a surface of the pop-up housing 30, the pop-up housing 30 is inserted into the mounting recess 23 and the shaft head portion 42a and the shaft 42 are also inserted. As the shaft 42 is inserted, the locking portion 43 is also inserted. Thus, in this particular example, by pressing, the pop-up housing 30 can be inserted or ejected.

Figure 8:
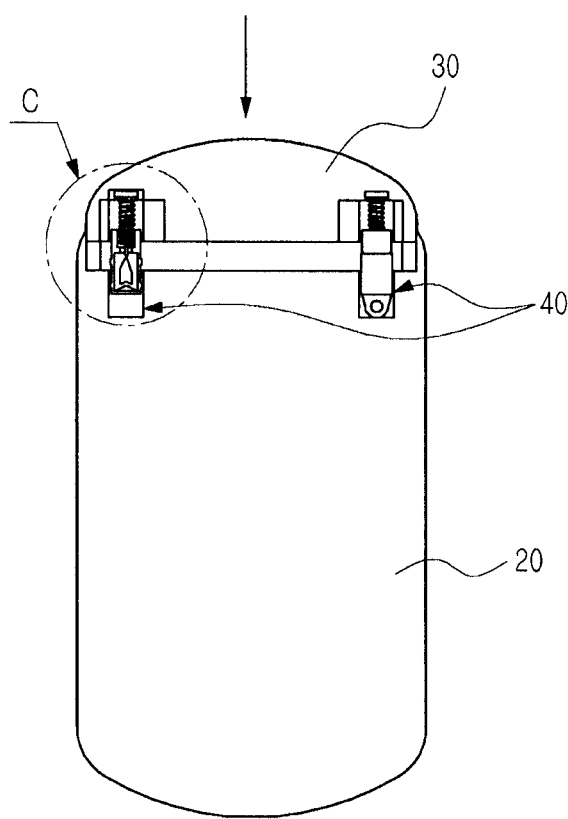
FIG. 8 is a cutaway plan view showing a pop-up apparatus for a portable communication device after being operated according to a first exemplary embodiment of the present invention.

Then, as shown in FIGS. 7 through 9, the second end of the locking portion 43 moves along the second guide cam 44c and when the pop-up housing 30 arrives at an insertion end position thereof, the second end of the locking portion 43 is inserted into the stopper portion 44a and is confined by being locked therein. The first end of the locking portion 43 is rotated in the rotation hole 42c to insert the second end of the locking portion 43 into the stopper portion 44a.

At this time, the pop-up housing 30 is inserted into the mounting recess 23 of the body housing 20 and maintains its inserted state.

As such, by providing the at least one or more pop-up hinge portions 40 to insert or eject the pop-up housing 30 in the body housing 20 through pressing of the pop-up housing 30, amusement in using a product can be enhanced and the exterior design of the product can be made to be more elegant.

With reference now to FIGS. 10 through 17, a detailed description will now be made of an operating process of a pop-up apparatus for a portable communication device according to a second exemplary embodiment of the present invention.

As shown in FIGS. 10 through 17, a pop-up apparatus 100 for a portable communication device includes a body housing 200 including a first housing 201 and a second housing 202, a pop-up housing 300 including a first housing 301 and a second housing 302, and at least one or more pop-up hinge portions 400. At both sides of the body housing 200 are provided button portions 500 exposed to outside. The pop-up housing 300 is embedded in the body housing 200 to be inserted into or ejected from the body housing 200 by pressing of the button portions 500. The pop-up hinge portions 400 are provided between the body housing 200 and the pop-up housing 300, such that the pop-up housing 300, upon being pressed, is confined in a state of being inserted into the body housing 200, and upon pressing of the button portions 500, the confined state thereof is released and thus the pop-up housing 300 is ejected from the body housing 200.

Figure 10:
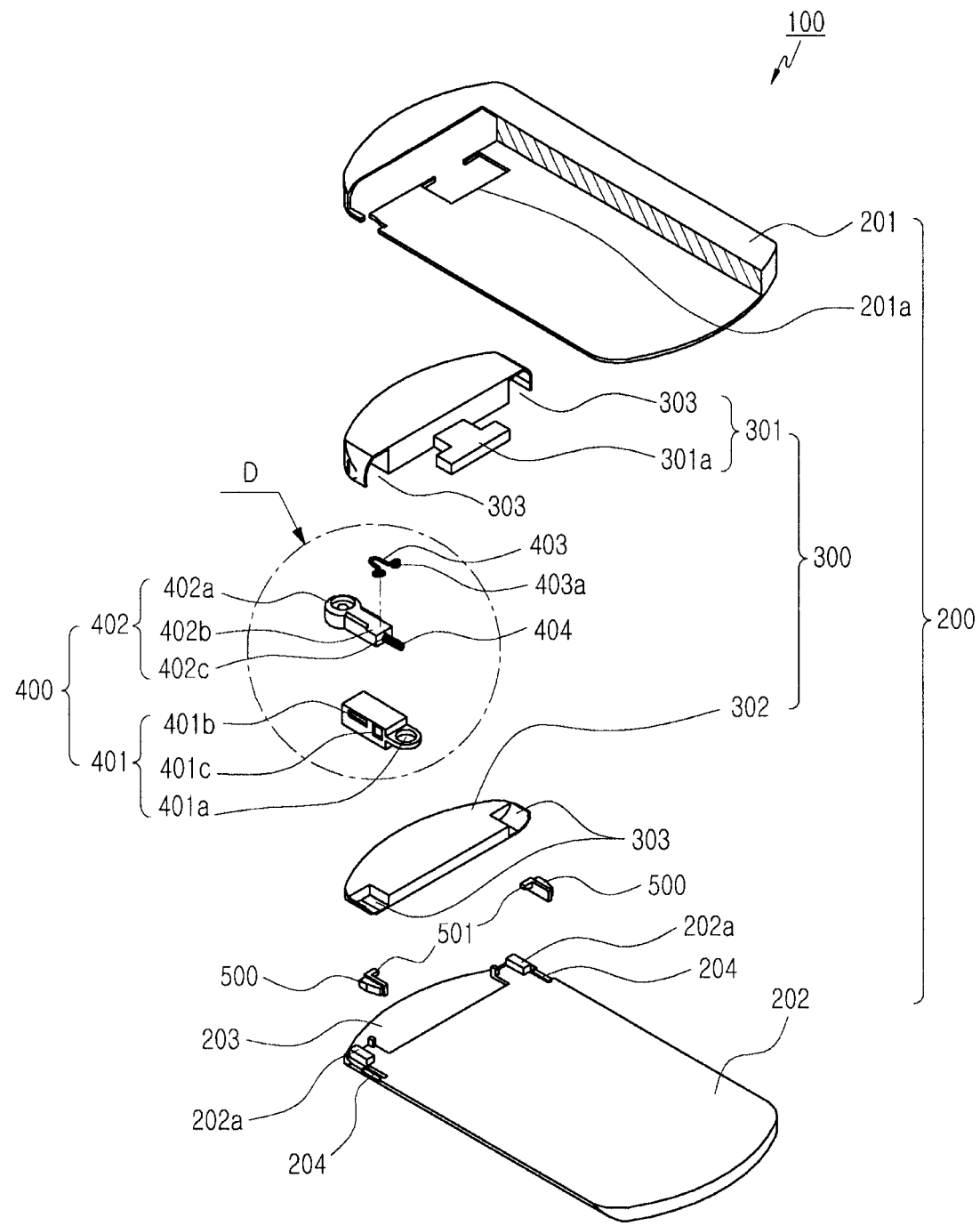
FIG. 10 is an exploded perspective view of a pop-up apparatus for a portable communication device according to a second exemplary embodiment of the present invention.
Figure 11:
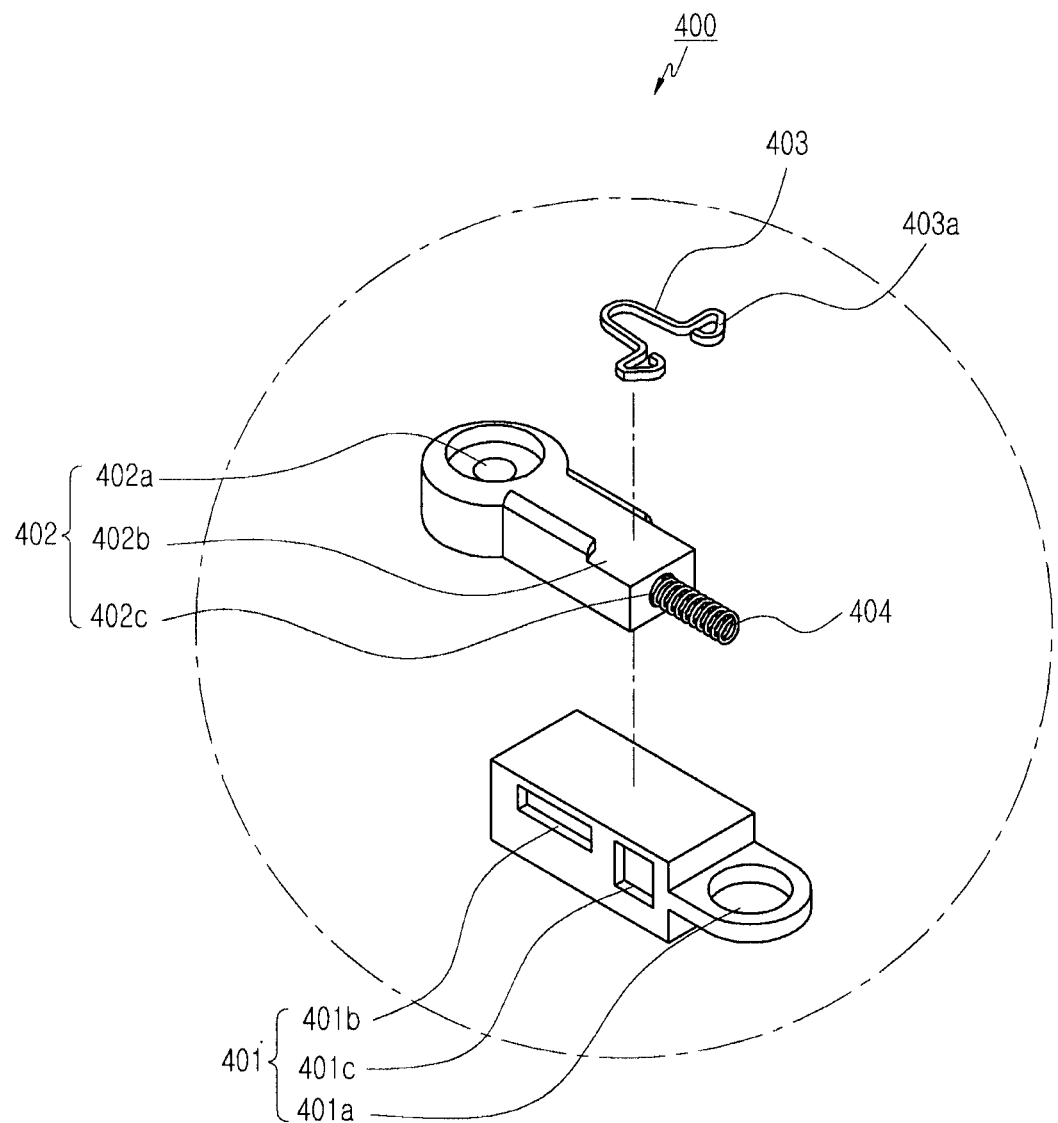
FIG. 11 is an enlarged cutaway plan view of a portion D of FIG. 10.

With reference to FIGS. 10 and 11, at an end of the body housing 200 is formed a mounting recess 203 (FIG. 10) for mounting the pop-up housing 300 such that the pop-up housing 300 can be inserted or ejected. On both sides of the body housing 200 are formed button holes 204 for receiving the button portions 500.

Figure 13:
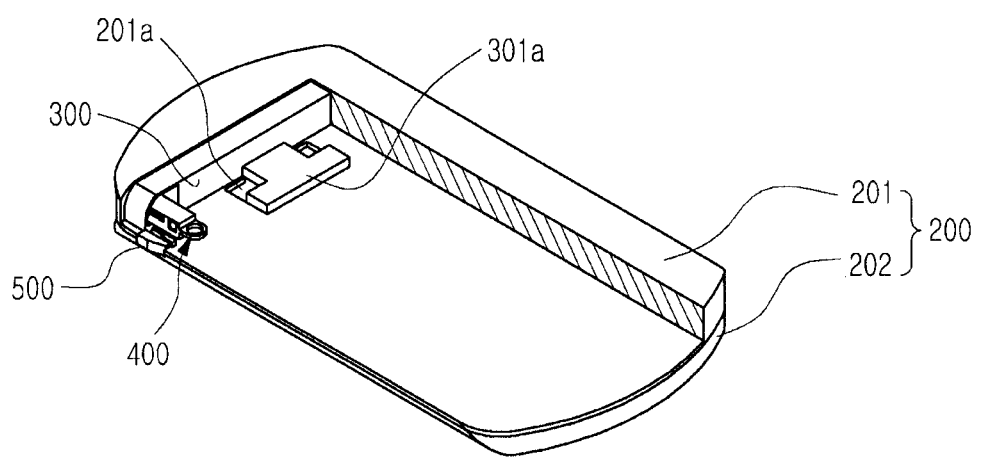
FIG. 13 is a cutaway perspective view showing a pop-up apparatus for a portable communication device prior to being operated according to a second exemplary embodiment of the present invention.
Figure 16:
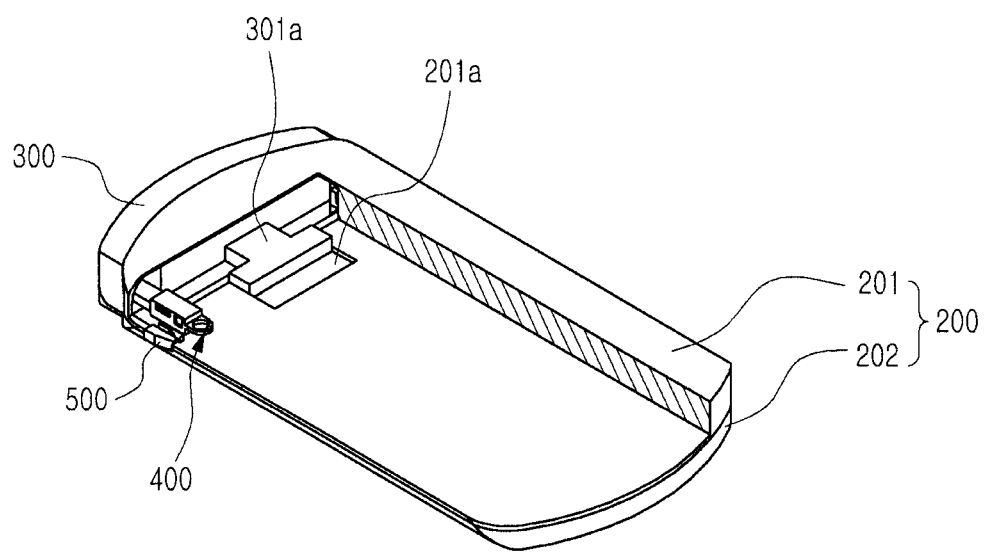
FIG. 16 is a cutaway perspective view showing a pop-up apparatus for a portable communication device after being operated according to a second exemplary embodiment of the present invention.

Now referring to FIGS. 10, 13, and 16, in the first housing 201 of the body housing 200 is formed a separation-preventing groove 201a for preventing separation of the pop-up housing 300 at insertion or ejection of the pop-up housing 300.

In the second housing 202 of the body housing 200 are formed first guide portions 202a to guide insertion/ejection of the pop-up housing 300 and to be coupled with the pop-up hinge portions 400. In the pop-up housing 300 are formed second guide portions 303 to guide insertion or ejection of the pop-up housing 300 while being coupled with the first guide portions 202a and to be coupled with the pop-up hinge portions 400.

As particularly shown in FIGS. 13 and 16, in the first housing 301 of the pop-up housing 300 is formed a separation-preventing protrusion 301a coupled with the separation-preventing groove 201a to prevent separation of the pop-up housing 300.

Figure 14:
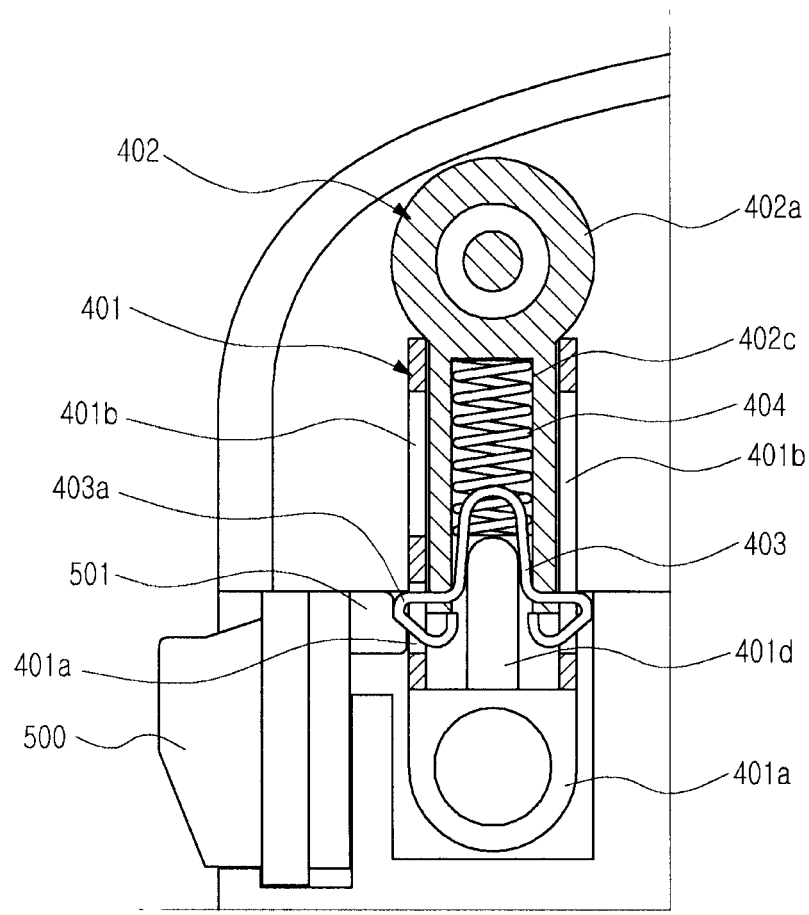
FIG. 14 is a cutaway plan view showing a pop-up apparatus for a portable communication device prior to being operated according to a second exemplary embodiment of the present invention.

In addition, the pop-up hinge portions 400 include a hinge housing 401, a shaft 402, a locking portion 403, and an elastic member 404 (see FIG. 14). The hinge housing 401 is adapted to receive the shaft 402, the locking portion 403, and the elastic member 404. The shaft 402 is provided in the hinge housing 401 such that it slides for insertion or ejection by pressing of the pop-up housing 300 and the button portions 500. The locking portion 403 is provided in the shaft 402 such that it moves with the shaft 402 and is confined by being locked by an elastic force at an insertion end position of the pop-up housing 300 and is unlocked by an elastic force by pressing of the button portions 500. The elastic member 404 is provided in the hinge housing 401 to provide an elastic force for sliding the shaft 402 by being coupled with the shaft 402.

An engaging portion 401a for engagement with the body housing 200 is formed at an end of the hinge housing 401, guide holes 401b for guiding the locking portion 403 are formed at both sides of the hinge housing 401, locking grooves 401c for confining the locking portion 403 by locking the locking portion 403 or for unlocking the locking portion 403 by separation are formed adjacent to the guide holes 401b, and a support protrusion 401d for supporting the elastic member 404 is formed in the hinge housing 401.

Moreover, the shaft 402 includes a shaft engaging portion 402a, a resting recess 402b, and an elastic groove 402c. The shaft engaging portion 402a is engaged with the pop-up housing 300 to be ejected by pressing of the button portions 500. The resting recess 402b is formed in the shaft 402 to rest the locking portion therein. The elastic groove 402c is formed in the shaft 402 such that the elastic groove 402c is coupled with the elastic member 404 in such a way to support the elastic member 404.

The locking portion 403 in this example includes a leaf spring. A first end of the locking portion 403 is rested in the resting recess 402b of the shaft 402, and at a second end thereof are formed a pair of locking protrusions 403a to be inserted into or removed from the locking grooves 401c of the hinge housing 401. The locking protrusions 403a are preferably formed in a hemispheric shape. The locking protrusions 403a may also be in a shape other than a hemispheric shape, for example, a spherical shape or a diamond shape.

On rear sides of the button portions 500 are formed contact protrusions 501 for contacting the locking protrusions 403a.

Figure 12:
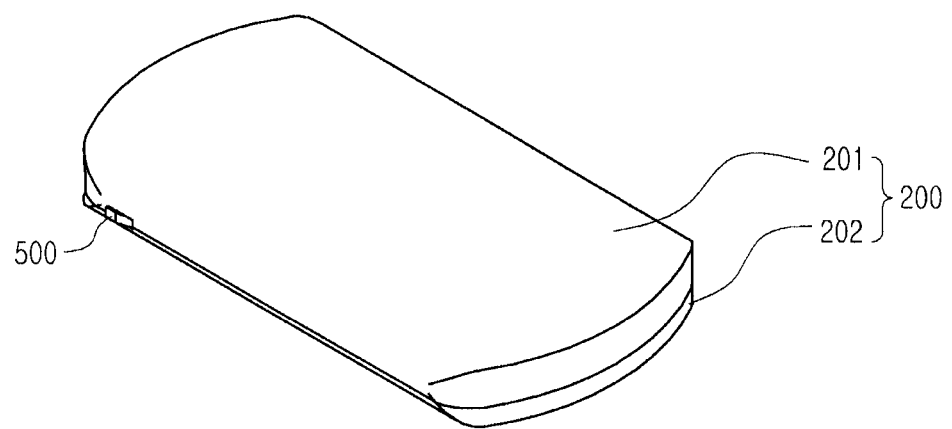
FIG. 12 is a perspective view showing a pop-up apparatus for a portable communication device prior to being operated according to a second exemplary embodiment of the present invention.

As shown in FIG. 12, when a user presses a surface of the pop-up housing 300 to insert the pop-up housing 300 into the body housing 200, the pop-up housing 300 is inserted (e.g. retracts) into the mounting recess 203 of the body housing 200.

Then, as shown in FIG. 14, the shaft 402 and the locking portion 403 are also pressed and move together, and the locking protrusions 403a of the locking portion 403 are guided along the guide holes 401b formed in the hinge housing 401.

When the pop-up housing 300 arrives at the insertion end position thereof, the locking protrusions 403a of the locking portion 403 are inserted into the locking grooves 401c of the hinge housing 401 and are confined by being locked by an elastic force.

As shown in FIG. 12, the pop-up housing 300 maintains its state of being inserted into the mounting recess 203 of the body housing 200 until pressure is applied to buttons 500 to eject the pop-up apparatus.

As shown in FIG. 14, the locking portion 403 preferably includes a leaf spring such that the pair of locking protrusions 403a of the locking portion 403 move along the guide grooves 40 lb. When arriving at a position adjacent to the locking grooves 401c, the locking protrusions 403a are inserted into the locking grooves 401c and thus confined by being locked by means of an elastic force acting with respect to each other.

Figure 15:
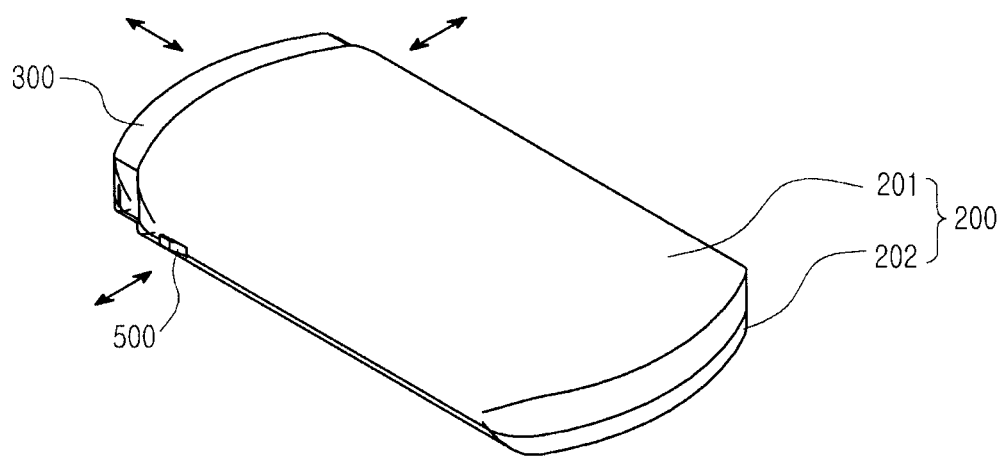
FIG. 15 is a perspective view showing a pop-up apparatus for a portable communication device after being operated according to a second exemplary embodiment of the present invention.
Figure 17:
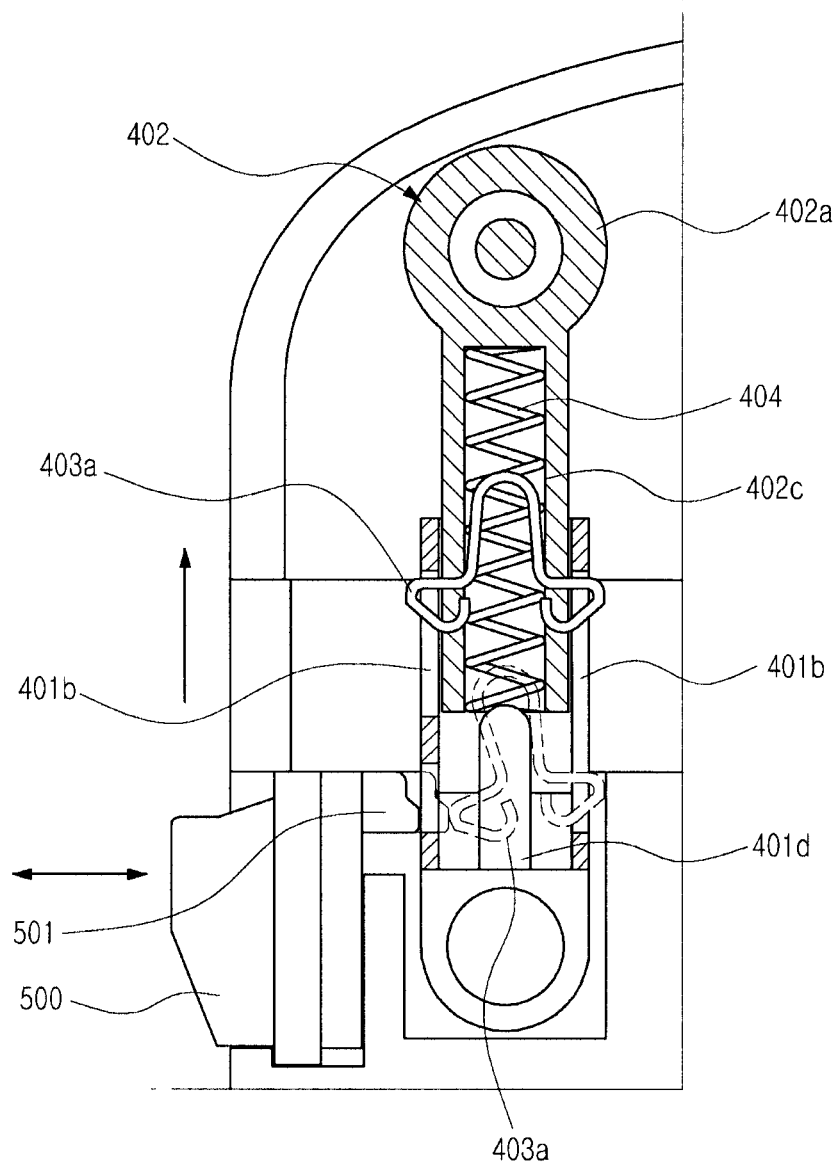
FIG. 17 is a cutaway plan view showing a pop-up apparatus for a portable communication device according to a second exemplary embodiment of the present invention.

Moreover, as shown in FIGS. 15 through 17, when the user presses the button portions 500 to eject the pop-up housing 300 from the mounting recess 203 of the body housing 200, the contact protrusions 501 formed on the rear sides of the button portions 500 contact the locking protrusions 403a and push the locking protrusions 403a inward from the hinge housing 401. At this time, the locking protrusions 403a leave from the locking grooves 401c and thus are unlocked.

Then, as shown in FIGS. 14 and 15, the shaft 402 moves due to an elastic force of the elastic member 404 provided in the shaft 402, and the pop-up housing 300 also moves, thus being ejected from the mounting recess 203 of the body housing 200.

In this way, by providing the at least one or more pop-up hinge portions 400 to insert the pop-up housing 300 into or eject the same from the body housing 200 by pressing of the button portions 500, the amusement in using a product can be enhanced and the exterior design of the product can be made more elegant than known heretofore.

A person of ordinary skill in the art should understand and appreciate that the above-described pop-up apparatus for a portable communication device according to the present invention is not limited to the foregoing embodiments and drawings, and various substitutions, modifications, and changes may be made therein without departing from the spirit and scope of the invention.

What is claimed is:

1. A pop-up apparatus for a portable communication device, the pop-up apparatus comprising:
    a body housing;
    a pop-up housing substantially embedded in the body housing and ejected from the body housing responsive to pressure exerted on a surface of the pop-up housing; and
    at least first and second spaced apart pop-up hinge portions provided between the body housing and the pop-up housing, each for providing a force to eject the pop-up housing from the body housing in a direction opposite to the pressure exerted on the pop-up housing;
    wherein an ejected portion of the pop-up housing extends across a majority of an entire side of the communication device.

2. The pop-up apparatus of claim 1, wherein the body housing comprises a first housing and a second housing;
    a mounting recess is formed at an end of the body housing for mounting the pop-up housing so as to substantially embed the pop-up housing therein such that the pop-up housing is inserted to and ejected from the body housing;
    first guide portions are formed in the mounting recess for guiding insertion and ejection of the pop-up housing from the body housing;
    wherein the pop-up housing comprises a first housing and a second housing; and
    second guide portions for guiding insertion or ejection of the pop-up housing while being coupled with the first guide portions are formed in the pop-up housing.

3. The pop-up apparatus of claim 1, further comprising:
    a plurality of first resting portions for resting the at least first and second pop-up hinge portions thereon, said first resting portions being formed in the body housing, and
    a plurality of second resting portions for resting the at least first and second pop-up hinge portions thereon, said second resting portions being formed in the pop-up housing.

4. The pop-up apparatus of claim 1, wherein each of the at least first and second pop-up hinge portions comprises:
    a hinge housing;
    a shaft provided in the hinge housing to slide in a first direction for insertion and in a second opposite direction for ejection responsive to pressure exerted on the pop-up housing;
    a locking portion rotatably coupled with the shaft;
    a guide stopper cam formed in the hinge housing such that as the shaft is pressed, the locking portion is rotated and is confined by being locked or is unlocked to permit the shaft to slide;
    an elastic member coupled with the shaft for providing an elastic force for sliding the shaft; and
    a hinge cover coupled with an outer side of the hinge housing.

5. The pop-up apparatus of claim 4, wherein the hinge housing is provided with an elastic space coupled with the elastic member;
    a through-hole for passing the shaft therethrough is formed in the hinge housing; and
    an engaging portion for engagement with the body housing is formed at an end of the hinge housing.

6. The pop-up apparatus of claim 4, wherein the shaft further comprises:
    a shaft head portion coupled with the pop-up housing;
    a rotation space formed downward from the shaft head portion to allow rotation of the locking portion; and
    a rotation hole formed in the rotation space to be rotatably coupled with the locking portion.

7. The pop-up apparatus of claim 6, wherein the locking portion comprises a wire locking portion, a first end of the locking portion being rotatably coupled with the rotation hole and a second end thereof being coupled with the guide stopper cam.

8. The pop-up apparatus of claim 4, wherein the guide stopper cam comprises:
    a stopper portion for moving the shaft and the locking portion responsive to pressure exerted on the pop-up housing for unlocking or confining the locking portion;
    a first guide cam formed adjacent to the stopper portion to guide the locking portion for ejecting the pop-up housing when the locking portion is unlocked from the stopper portion; and
    a second guide cam formed adjacent to the stopper portion to guide the locking portion for inserting the pop-up housing when the locking portion is confined in the stopper portion.

9. The pop-up apparatus of claim 1, wherein the pop-up housing comprises at least one of a speaker module, a microphone device, a screen and a camera lens.

10. A pop-up apparatus for a portable communication device, the pop-up apparatus comprising:
    a body housing;

a pop-up housing substantially embedded in the body housing and ejected from the body housing responsive to pressure exerted on a surface of the pop-up housing; and at least first and second spaced apart pop-up hinge portions provided between the body housing and the pop-up housing, each for providing a force to eject the pop-up housing from the body housing in a direction opposite to the pressure exerted on the pop-up housing;

wherein an ejected portion of the pop-up housing extends across an entire side of the communication device.

11. The pop-up apparatus of claim 10, wherein the communication device is generally a solid rectangle, and the ejected portion of the pop-up housing extends substantially across an entire width of the solid rectangle.

12. A pop-up apparatus for a portable communication device, the pop-up apparatus comprising:

a body housing;

a pop-up housing substantially embedded in the body housing and ejected from the body housing responsive to pressure exerted on a surface of the pop-up housing in a direction opposite to that of the exerted pressure; and at least first and second spaced apart pop-up hinge portions, each provided between the body housing and the pop-up housing, and each providing a force for ejecting the pop-up housing from the body housing responsive to the pressure exerted on the pop-up housing.

13. The pop-up apparatus of claim 12, wherein an ejected portion of the pop-up housing extends across substantially an entire side of the communication device.

14. The pop-up apparatus of claim 13, wherein the body housing comprises a first housing and a second housing;

a mounting recess is formed at an end of the body housing for mounting the pop-up housing so as to substantially embed the pop-up housing therein such that the pop-up housing is inserted to and ejected from the body housing;

first guide portions are formed in the mounting recess for guiding insertion or ejection of the pop-up housing from the body housing;

wherein the pop-up housing comprises a first housing and a second housing; and second guide portions for guiding insertion or ejection of the pop-up housing while being coupled with the first guide portions are formed in the pop-up housing.

15. The pop-up apparatus of claim 13, further comprising:

a plurality of first resting portions for resting the first and second pop-up hinge portions thereon, the first resting portions being formed in the body housing, and a plurality of second resting portions for resting the at least first and second pop-up hinge portions thereon, the second resting portions being formed in the pop-up housing.

16. The pop-up apparatus of claim 13, wherein the first and second pop-up hinge portions each comprises:

a hinge housing;

a shaft provided in the hinge housing to slide in a first direction for insertion and in a second opposite direction for ejection responsive to pressure exerted on the pop-up housing;

a locking portion rotatably coupled with the shaft;

a guide stopper cam formed in the hinge housing such that as the shaft is pressed, the locking portion is rotated and is confined by being locked or is unlocked to permit the shaft to slide;

an elastic member coupled with the shaft for providing an elastic force for sliding the shaft; and a hinge cover coupled with an outer side of the hinge housing.

17. The pop-up apparatus of claim 16, wherein the hinge housing is provided with an elastic space coupled with the elastic member;

a through-hole for passing the shaft therethrough is formed in the hinge housing; and an engaging portion for engagement with the body housing is formed at an end of the hinge housing.

18. The pop-up apparatus of claim 16, wherein the shaft further comprises:

a shaft head portion coupled with the pop-up housing;

a rotation space formed downward from the shaft head portion to allow rotation of the locking portion; and a rotation hole formed in the rotation space to be rotatably coupled with the locking portion.

19. The pop-up apparatus of claim 18, wherein the locking portion comprises a wire locking portion, a first end of the locking portion being rotatably coupled with the rotation hole and a second end thereof being coupled with the guide stopper cam.

20. The pop-up apparatus of claim 16, wherein the guide stopper cam comprises:

a stopper portion for moving the shaft and the locking portion responsive to pressure exerted on the pop-up housing for unlocking or confining the locking portion;

a first guide cam formed adjacent to the stopper portion to guide the locking portion for ejecting the pop-up housing when the locking portion is unlocked from the stopper portion; and a second guide cam formed adjacent to the stopper portion to guide the locking portion for inserting the pop-up housing when the locking portion is confined in the stopper portion.

* * * * *